United States Patent
Merkel et al.

(10) Patent No.: US 6,802,102 B1
(45) Date of Patent: Oct. 12, 2004

(54) PRIMARY SHAFT FOR A WINDSCREEN WIPER

(75) Inventors: Wilfried Merkel, Kappelrodeck (DE); Roger Daenen, Vlytingen (DE)

(73) Assignee: Robert Bosch GmbH, STuttgart (DE)

( * ) Notice: Subject to any disclaimer, the term of this patent is extended or adjusted under 35 U.S.C. 154(b) by 396 days.

(21) Appl. No.: 09/831,056

(22) PCT Filed: Sep. 1, 2000

(86) PCT No.: PCT/DE00/02993

§ 371 (c)(1),
(2), (4) Date: May 4, 2001

(87) PCT Pub. No.: WO01/21460

PCT Pub. Date: Mar. 29, 2001

(30) Foreign Application Priority Data

Sep. 21, 1999 (DE) .......................................... 199 45 091

(51) Int. Cl.[7] .............................. A47L 1/00; B60S 1/02; B60S 1/24
(52) U.S. Cl. ................................ 15/250.34; 15/250.31; 15/250.01; 15/250.05; 403/299; 403/270
(58) Field of Search ......................... 15/250.34, 250.01, 15/250.05, 250.27, 250.31, 250.3, 250.04; 403/1, 409.1, 299, 34, 270–272, 267, 342–343, 365, 367–368, 379.3, 359.5, 179, 404; 74/595; 411/366.1–376; 174/87; 464/160, 161, 18; 428/652, 653

(56) References Cited

U.S. PATENT DOCUMENTS

| 2,714,739 | A | * | 8/1955 | Neufeld ................... 15/250.04 |
| 3,085,821 | A |   | 4/1963 | Ryck |
| 3,962,744 | A | * | 6/1976 | Bien et al. ............... 15/250.34 |
| 4,527,978 | A | * | 7/1985 | Zackrisson ................... 464/183 |
| 5,454,134 | A |   | 10/1995 | Edele |
| 5,621,943 | A |   | 4/1997 | Berge |
| 5,699,582 | A | * | 12/1997 | Berge et al. ............. 15/250.34 |
| 6,227,747 | B1 | * | 5/2001 | Remington et al. ........... 403/12 |
| 6,558,066 | B1 | * | 5/2003 | Zimmer ................... 403/374.4 |

FOREIGN PATENT DOCUMENTS

| DE | 89 13 885.6   | 3/1990 |
| DE | 44 28 371 A1  | 2/1996 |
| EP | 0 771 958 A   | 5/1997 |
| EP | 0 781 692 A   | 7/1997 |
| FR | 2 646 801     | 5/1989 |

* cited by examiner

Primary Examiner—Terrence R. Till
Assistant Examiner—Laura C Cole
(74) Attorney, Agent, or Firm—Michael J. Striker

(57) ABSTRACT

A windshield wiper includes a drive shaft (10), to which shaft a crank (12) is fastened. A base body (14) of the drive shaft (10) is made from an extruded light metal profile and on its free end, in the region of a fastening part, carries a connection part (16, 22) of a harder material, which has a screw thread (18).

11 Claims, 1 Drawing Sheet

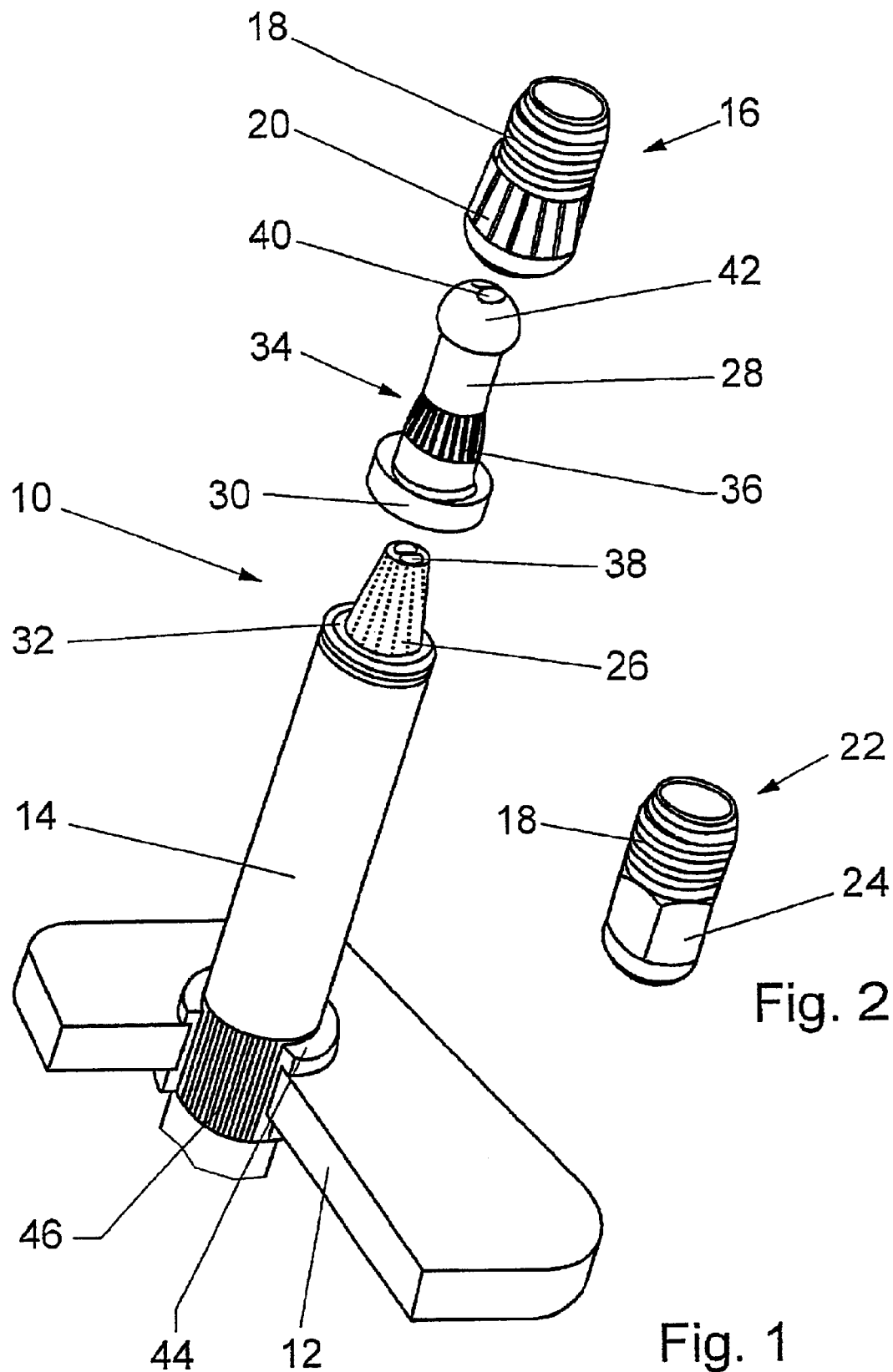

PRIMARY SHAFT FOR A WINDSCREEN WIPER

BACKGROUND OF THE INVENTION

The invention is based on a drive shaft for a windshield wiper.

Known windshield wipers have a wiper arm, which is constructed from a fastening part and a hinge part, pivotably connected to it via a foldaway joint, and having a wiper rod. A hooklike end of the wiper rod engages a suspension box of a wiper blade, which is formed by two side cheeks of a middle bracket and includes a connection part with a hinge bolt. The joint thus formed guides the wiper blade over the vehicle window during the pivoting motion.

The wiper arm is connected via its fastening part solidly but detachably to a drive shaft. The drive shaft protrudes from the vehicle body and on its free shaft end it has an outer cone, which cooperates with an inner cone on the fastening part, in that a screw nut firmly presses the conical parts together. The drive shaft is as a rule made from steel and is riveted to a crank on its drive-side end.

From German Patent Disclosure DE 44 28 371 A1, a shaft hub connection of a windshield wiper is known in which the drive shaft, in the connecting region with the fastening part, has a cross section other than circular, and in particular a polygonal cross section, and has a shoulder. The fastening part rests with one edge of a recess on the shoulder or on a shim, and the recess widens conically toward the end of the drive shaft. A fitting conical clamping part is inserted into the recess and is pressed against the fastening part by a screw nut. The clamping part has a passageway for the drive shaft, and the cross-sectional profile of the passageway is complimentary to that of the drive shaft.

A shaft hub connection of a windshield wiper is also known from U.S. Pat. No. 3,085,821. The fastening part rests with one edge of a recess on a shoulder of the drive shaft or a shim, and the recess widens conically toward the end of the drive shaft. A fitting conical clamping part is inserted into the recess and presses a screw nut against the fastening part. The clamping part has a passageway for the drive shaft that fits a cylindrical or conical region of the drive shaft with knurling or a zigzag surface. As a result of the conical connection between the fastening part and the clamping part and optionally the conical connection between the clamping part and the drive shaft, the zigzag surface of the fastening part and of the drive shaft is pressed into what until then was a largely smooth surface of the clamping part and deforms it permanently. To that end, the clamping part comprises an elastomer material or a relatively soft nonferrous metal. In addition to a nonpositive engagement, a reinforcing positive engagement is achieved by means of many small side faces of the zigzags.

From German Utility Model DE 89 13 885 U1, it is known to dispose a spray nozzle on a housing of a wiper bearing. A water conduit extends parallel to the drive shaft through the bearing housing to the spray nozzle.

French Patent Disclosure FR 2 646 801 A shows a windshield wiper with a wiper arm and a wiper blade of plastic. The wiper arm has a hollow profile and is made by an internal gas pressure process. One version has a hinge part with a formed-on hollow wiper rod, and the hollow space is part of a windshield washer and has spray holes that are aimed at the windshield. In a variant, the wiper arm has no hinge part; instead, the wiper rod is formed directly onto the fastening part. The washing fluid is delivered through the drive shaft here.

SUMMARY OF THE INVENTION

According to the invention, the base body of the drive shaft is made from an extruded light metal profile. On its free end in the region of a fastening part, it has a connection part of a harder material, which has a screw thread. As the material, steel will be considered primarily, but other materials are also fundamentally suitable, such as copper and bronze.

The drive shaft of the invention is very light in weight and can be produced economically in many variants. For instance, for receiving a fastening part, the connection part can have a conical seat with fluting or with a polygonal slaving profile, and the material can be adapted optimally to the increased demands in terms of pressure per unit of surface area, wear resistance, and mounting capability. Thus reliable, easily released seating of the fastening part is assured even after frequent assembly and disassembly.

The connection part is expediently connected by means of adhesive bonding, welding, pressing, or assembly casting. To that end, a conical protrusion on the base body is advantageous. On the one hand, it facilitates centering of the two parts to one another; on the other hand, it makes a large joining area possible, by way of which the forces and torques are readily transmitted.

For the assembly casting, the connection part is placed on the base body, and the adjoining gap is filled by injection of liquid zinc, magnesium, lead, tin, or a suitable alloy. An adapter piece of zinc or a suitable material can be disposed between the base body and the connection part and can penetrate the base body or connection part. The adapter piece is expediently also seated on a longitudinally fluted, conical protrusion of the base body and itself has a fluted cone for receiving the connection part.

The drive shaft, comprising a base body, optionally an adapter piece and the connection part, can, without substantial additional cost, have one or more longitudinal conduits, through which washing fluid can be carried to spray nozzles, which can be disposed in or on a wiper arm, not otherwise shown. The longitudinal conduits can also receive heating lines for heating up the washing fluid.

To make the connection part with a central bore simple in design, it is expedient to provide the adapter piece of zinc with longitudinal conduits and extend it through the connection part The adapter piece can have an outward-pointing head, to which conduits leading onward can easily be connected.

A similar fastening technique as for the connection part can also be used for the crank. Here it is expedient that the base body, on the end toward the crank, has a region with fluting in the longitudinal direction, over which fluting the crank of a harder material is cast with the base body.

To avoid contact corrosion among the various components of the drive shaft, it is advantageous that the base body and the connection part or the crank are chemically nickel-plated after being joined together.

BRIEF DESCRIPTION OF THE DRAWINGS

Further advantages will become apparent from the ensuing drawing description. Exemplary embodiments of the invention are shown in the drawing. The drawing, specification and claims include numerous characteristics in combination. One skilled in the art will expediently consider the characteristics individually as well and put them together to make useful further combinations.

Shown are:

FIG. 1, a drive shaft of the invention in an exploded view; and

FIG. 2, a variant of a connection part.

DETAILED DESCRIPTION OF THE PREFERRED EMBODIMENTS

A drive shaft 10 is put together from a plurality of parts solidly joined together, specifically a base body 14, a crank 12, a connection part 16, 22, and optionally an adapter piece 28.

The base body 14 is made from an extruded light metal profile and has two longitudinal conduits 38 and a conical protrusion 26, which can have longitudinal fluting. The connection part for a fastening part of a wiper arm can be placed on the conical protrusion 26 either directly or indirectly via the adapter piece and joined to the base body by means of adhesive bonding, welding, pressing, or assembly casting. The adapter piece 28 rests with its collar 30 on a shoulder 32 of the base body 14.

Toward the connection part 16, the adapter piece 28 has a cone 34 with fluting 36, onto which the connection part 16 is placed or pressed. The adapter piece 28 protrudes with its head 42 through the connection part 16. The adapter piece 28 likewise has longitudinal conduits 40, which lengthen the longitudinal conduits 38 of the base body 14 and to which conduits leading onward can be connected.

The connection part 16 is made from a harder material, so that it can readily withstand the greater stresses in the region of a screw thread 18 or a conical seat 20. This assures a more secure seat of the wiper arm and easy assembly and disassembly of the wiper arm. The connection part 22, instead of the conical seat 20 of the connection part 16, has a polygonal slaving profile 22, which can extend slightly conically toward the screw thread 18.

The crank 12, similarly to the connection part 16 or 22, is joined to the base body 14 via a connecting layer 44 of zinc or some other suitable material by assembly casting. The base body, at the connecting point, has fluting 46, as a result of which the material engagement is reinforced by a positive engagement.

List of Reference Numerals

10 Drive shaft
12 Crank
14 Base body
16 Connection part
18 Screw thread
20 Conical seat
22 Connection part
24 Slaving profile
26 Protrusion
28 Adapter piece
30 Collar
32 Shoulder
34 Cone
36 Fluting
38 Longitudinal conduit
40 Longitudinal conduit
42 Head
44 Connecting layer
46 Fluting

What is claimed is:

1. A drive shaft (10) for a windshield wiper, comprising a crank (12) fastened to the drive shaft and wherein the drive shaft has a cylindrical screw thread on a free end in a region of a fastening part, wherein the drive shaft includes a base body (14) made from an extruded light metal profile and a connection part (16, 22) made from a harder material, wherein said connection part is fixedly connected with the free end of the base body and includes said screw thread.

2. The drive shaft (10) of claim 1, wherein the connection part (16, 22) is made of steel, bronze or copper.

3. The drive shaft (10) of claim 1, wherein the connection part (16) has a conical seat (20) with fluting for the fastening part.

4. The drive shaft (10) of claim 1, wherein the connection part (22) has a polygonal slaving profile (24).

5. The drive shaft (10) of claim 1, wherein the base body (14) has a conical protrusion (26), wherein the connection part (16) is placed onto the conical protrusion and wherein the connection part is joined by adhesive bonding, welding, press-fitting or assembly casting to the conical protrusion.

6. The drive shaft (10) of claim 5, wherein the connection part (16, 22) is cast with the base body (14) via an adapter piece (28).

7. The drive shaft (10) of claim 6, wherein the connection part (16, 22) is seated on a longitudinally fluted conical protrusion (26) of the base body, or on a fluted cone (34) of the adapter piece (28).

8. The drive shaft (10) of claim 6, wherein the connection part (16, 22) is embodied as a threaded sleeve, wherein the adapter piece (28) having at least one longitudinal conduit (40) is guided through the threaded sleeve.

9. The drive shaft (10) of claim 1, wherein the drive shaft has at least one longitudinal conduit (38, 40).

10. The drive shaft (10) of claim 1, wherein the base body (14) and the connection part (16, 22) or the crank (12) are chemically nickel-plated after being joined together.

11. The drive shaft (10) of claim 1, wherein on an end toward the crank, the base body (14) has a region with fluting (46) in a longitudinal direction, wherein the crank (12), of a harder material, is cast to the base body (14) with a connecting layer (42) of zinc over the fluting.

* * * * *